United States Patent Office.

ROBERT M. LIVINGSTON, OF MOBILE, ALABAMA.

*Letters Patent No. 65,494, dated June 4, 1867*

---

IMPROVED COMPOSITION OR PASTE FOR ARTICLE OF FOOD.

---

*The Schedule referred to in these Letters Patent and making part of the same.*

---

Be it known that I, ROBERT M. LIVINGSTON, of the city and county of Mobile, and State of Alabama, have originated a new and useful Compound or Paste as an Article of Food and of Commerce, and which I term "Cacio di Macerone, or Maccaroni Cheese," of which the following is a full, clear, and exact description and the mode of preparing the same, viz:

To thirty-two (32) parts of cheese I add five (5) parts of olive or other proper oil, two (2) parts of mustard, one and a half ($1\frac{1}{2}$) parts of salt, one (1) part of pepper vinegar, and eight (8) parts of pulverized biscuit. The whole are intimately mixed and then ground into a paste, and these operations of mixing and of grinding are performed by any machinery or method adapted to such purposes.

What I claim as my invention, and desire to secure by Letters Patent, is—

A cheese compound or paste substantially as above described.

ROBT. M. LIVINGSTON.

Witnesses:
    JNO. P. RENNY,
    WM. T. AYERS.